United States Patent
Behrendt et al.

(10) Patent No.: US 7,590,987 B2
(45) Date of Patent: Sep. 15, 2009

(54) APPARATUS AND METHOD FOR INTEGRATING VARIABLE SUBSIDIARY INFORMATION WITH MAIN OFFICE INFORMATION IN AN ENTERPRISE SYSTEM

(75) Inventors: Christoph Behrendt, Nussloch (DE); Werner Wolf, Wiesloch (DE); Steffen Riemann, St. Leon-Rot (DE); Björn Müller-Punge, Stutensee (DE); Hua Wang, Shanghai (CN)

(73) Assignee: SAP AG, Walldorf (DE)

( * ) Notice: Subject to any disclaimer, the term of this patent is extended or adjusted under 35 U.S.C. 154(b) by 1342 days.

(21) Appl. No.: 10/453,527

(22) Filed: Jun. 4, 2003

(65) Prior Publication Data

US 2004/0010496 A1    Jan. 15, 2004

Related U.S. Application Data

(60) Provisional application No. 60/386,370, filed on Jun. 5, 2002.

(51) Int. Cl.
*G06F 9/44* (2006.01)
*G06F 17/30* (2006.01)
*G06F 15/16* (2006.01)

(52) U.S. Cl. .................. 719/328; 719/313; 707/10; 709/246

(58) Field of Classification Search .............. 719/310, 719/313, 315, 328, 330; 709/200, 201, 203, 709/217–219, 246, 250; 707/1, 10; 717/102, 717/103, 120–123
See application file for complete search history.

(56) References Cited

U.S. PATENT DOCUMENTS

| | | | | |
|---|---|---|---|---|
| 6,041,362 | A | 3/2000 | Mears et al. ............. | 709/300 |
| 6,253,282 | B1 | 6/2001 | Gish ....................... | 711/113 |
| 6,334,158 | B1 | 12/2001 | Jennye et al. ............ | 709/328 |
| 6,546,430 | B2 | 4/2003 | Gray, III et al. .......... | 709/310 |
| 6,621,505 | B1 | 9/2003 | Beauchamp et al. ..... | 345/764 |
| 7,017,162 | B2 * | 3/2006 | Smith et al. .............. | 719/328 |
| 7,093,200 | B2 * | 8/2006 | Schreiber et al. ......... | 715/835 |
| 7,146,399 | B2 * | 12/2006 | Fox et al. ................. | 709/203 |
| 7,257,817 | B2 * | 8/2007 | Cabrera et al. ........... | 719/310 |
| 7,340,714 | B2 * | 3/2008 | Upton ..................... | 717/102 |
| 2003/0179228 | A1 * | 9/2003 | Schreiber et al. ......... | 715/738 |
| 2004/0015578 | A1 * | 1/2004 | Karakashian et al. .... | 709/223 |
| 2004/0045005 | A1 * | 3/2004 | Karakashian ............ | 719/310 |
| 2006/0156253 | A1 * | 7/2006 | Schreiber et al. ......... | 715/835 |

* cited by examiner

*Primary Examiner*—Van H Nguyen
(74) *Attorney, Agent, or Firm*—Kenyon & Kenyon LLP

(57) ABSTRACT

The present invention pertains to an enterprise-wide enterprise resource planning (ERP) system, and in particular, to methods and systems for interfacing the enterprise-wide ERP system with ERP systems at subsidiary organizations. In accordance with an embodiment of the present invention, a method includes connecting to an enterprise data management system through a data base server, a web service and a data interface application programming interface (API) in a remote data system and through a data mapping component and an intermediate documents (IDOC) adapter in a data exchange interface using simple object address protocol (SOAP) messages and extensible markup language (XML) messages.

14 Claims, 8 Drawing Sheets

APPARATUS AND METHOD FOR INTEGRATING VARIABLE SUBSIDIARY INFORMATION WITH MAIN OFFICE INFORMATION IN AN ENTERPRISE SYSTEM

CROSS REFERENCE TO RELATED APPLICATION

This application claims benefit of priority of U.S. patent application Ser. No. 60/386,370, filed Jun. 5, 2002.

FIELD OF THE INVENTION

The present invention pertains to an enterprise-wide enterprise resource planning (ERP) management system, and in particular, to methods and systems for interfacing the enterprise-wide ERP management system with information systems at subsidiary organizations.

BACKGROUND

In today's large national and multi-national corporations, which frequently have numerous diverse small and middle-sized business subsidiaries, data integration between a corporate headquarters ERP management system and the ERP systems at each subsidiary can be an almost impossible task. In fact, up to 40% of all small and middle-sized businesses are subsidiaries of large corporations. It is common for subsidiaries to have implemented different solutions that are not completely compatible with the solutions at the corporate headquarters. It is also common for the subsidiaries to have access to fewer information technology resources than what is available at the corporate headquarters. This may occur for many reasons including: not using centralized planning and control to design the individual systems at each of the locations to be compatible; disparities in computing capabilities between the locations; or a subsidiary being purchased with a different existing information system. In addition, ERP systems at subsidiaries are often by design smaller and less capable, since the subsidiary system does not have the same data processing requirements as at the corporate headquarters.

Because of this system diversity, it can be extremely difficult, time consuming and expensive even to connect to all of the different ERP systems at diverse corporation's locations. In fact, it can be even more difficult, time consuming and expensive to enable all of the locations to be able to coherently share and use the information from each other location. Therefore, it would be desirable to be able to connect, easily and efficiently, a corporate headquarters ERP management system to all subsidiary ERP systems to enable the sharing of the information in each of the separate ERP systems.

DETAILED DESCRIPTION

Embodiments of the present invention provide improved methods and systems for seamlessly interfacing and scaling an enterprise-wide management information system, for example, an enterprise resource planning (ERP) management system at a headquarters location with ERP systems at subsidiary and/or supplier organizations. For example, the functional systems with each ERP may include logistics/supply, human resources, finance and the like. The ERP systems at the subsidiary and supplier organizations frequently are not similar and/or directly compatible with the ERP system at the headquarters location. According to an embodiment of the present invention, an information exchange component may serve to integrate the headquarters ERP system with the subsidiary and/or supplier ERP systems using standardized, predetermined query and response interfaces and/or a data mapping tool. This information exchange component may also be referred to as an integration server. Thus, a user at a remote location may connect to the ERP using a data base server, a web server and a data interface application programming interface (API) at the remote location through a data mapping component and an intermediate documents (IDOC) adapter in a data exchange interface (XI). To enable this ease of connectivity, the present invention takes advantage of a significant level of information being relatively universal in ERP systems and to provide the standardized, predetermined query and response interfaces with which to facilitate the connection and request for and receipt of information. For example, the interfaces may make use of predetermined formats and/or data mappings to make most user queries from the remote location and to display the results from the queries at the remote location. Therefore, embodiments of the present invention may be easily customized, are easy to implement, and help lower system costs for implementation and maintenance.

Similarly, according to the embodiment, a supply chain manager at the headquarters ERP system may use the connection to the subsidiary and/or supplier systems to request information. In fact, the supply chain manager may use similar standardized, predetermined query and response interface formats specific to the type and/or source of information being requested from the subsidiary and/or supplier systems and to view the responses at the headquarters ERP system.

Figure 1:
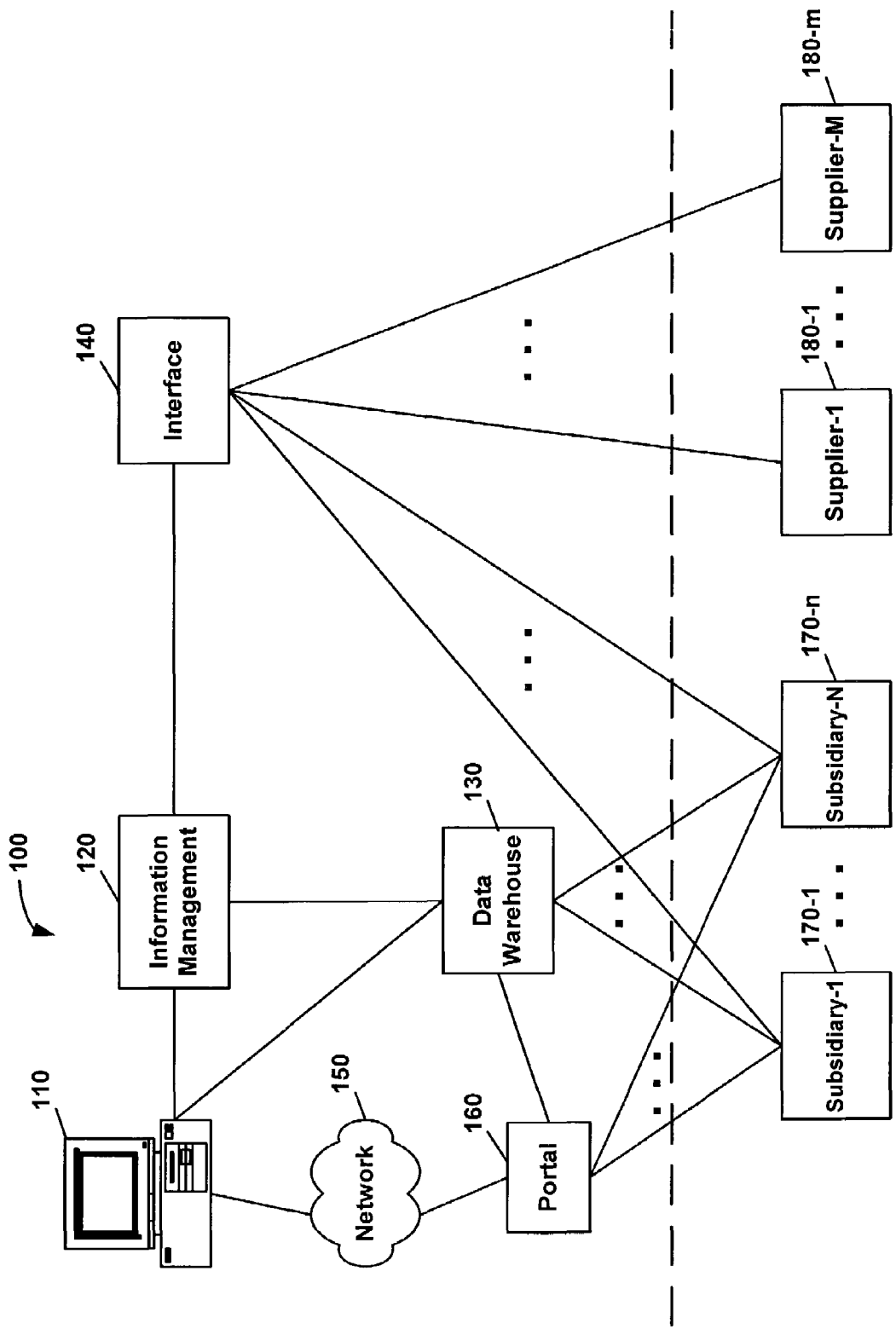
FIG. 1 is a block diagram of an enterprise-wide integrated ERP management system, in which embodiments of the present invention may be used.

FIG. 1 is a block diagram of an enterprise-wide integrated information management system 100, in which embodiments of the present invention may be used. In FIG. 1, integrated information management system 100 may include one or more user workstations 110, which may be connected to an information management application 120, which may provide access to all data located at a headquarters office, and a data warehouse application 130. For example, in accordance with an embodiment of the present invention, information management application 120 may include a mySAP and/or a SAP R/3 Enterprise Resource Planning (ERP) Solution, both from SAP Aktiengesellschaft of Frankfurt Germany. Information management application 120 may also be connected to data warehouse application 130 and an interface application 140. Data warehouse application 130 may provide access to consolidated data from subsidiary organizations related to and a headquarter company at which data warehouse application 130 may be resident. Interface application 140 may enable integration of different versions of the same application as well as different applications located at subsidiaries related to the headquarter company and/or suppliers unrelated to the headquarter company.

For example, in FIG. 1, in accordance with an embodiment of the present invention, data warehouse application 130 may include a mySAP Business Warehouse (BW) and interface application 140 may include an Exchange Infrastructure, both from SAP Aktiengesellschaft. User workstation 110 may be running an Internet browser program, for example, Internet Explorer® from Microsoft Corporation and/or Netscape Communicator from Netscape Communications, and may be "logged-on", that is, connected to, a web page (not shown) on a portal 160 via a network 150. A user may logon to the web page by entering a universal resource locator (URL) in an address field of the browser program. In accordance with an embodiment of the present invention, network 150 may be a communications network, such as, for example, an Intranet and/or an Internet, and portal 160 may permit a user at workstation 110 to view information stored in ERP systems distributed at subsidiaries of the headquarters office. Portal 160 also may be connected to data warehouse application 130 and, in accordance with an embodiment of the present invention, may include an Enterprise Portal from SAP Aktiengesellschaft. In accordance with an embodiment of the present invention, user workstation 110, information management application 120, data warehouse application 130, interface application 140, network 150 and portal 160 may all be located at a single site, for example, a company's headquarters location.

In addition, embodiments of the present invention are contemplated in which the above-listed components may be located at multiple sites, generally, within the headquarter company's location. For example, the components may either be physically closely located, that is, within the same room or building, or separated, that is, in separate rooms, buildings, etc. within the headquarter company's location. However, it may also be possible to have the system components located in separate locations, for example, different cities, if the company has a decentralized structure.

In FIG. 1, in accordance with an embodiment of the present invention, interface application 140, network 150 and portal 160 may each be separately connected to one or more remote information management systems at subsidiary-1 . . . subsidiary-N 170-1 . . . 170-n. Each of the remote information management systems located at a regional office and/or a subsidiary company may include, for example, a SAP Business One resource planning solution from SAP Aktiengesellschaft. In general, the data in each subsidiary's remote information management system may also be contained in data warehouse application 130. However, the data in data warehouse application 130 may not be the most current and may not be in exactly the same format as at each subsidiary. For example, the same data may be identified by different field names in a database at each subsidiary, and/or may be stored in fields with different sizes. The use of different field names may occur when existing systems that were not originally developed to be compatible with each other are combined. The different sizes may also result from combining data from two or more fields at one subsidiary that are contained in separate fields at another subsidiary. Therefore, it may be necessary to "map", that is, convert the data from one format to another or to map fields with the same data but different field names when performing data reconciliation/consolidation functions.

Figure 2:
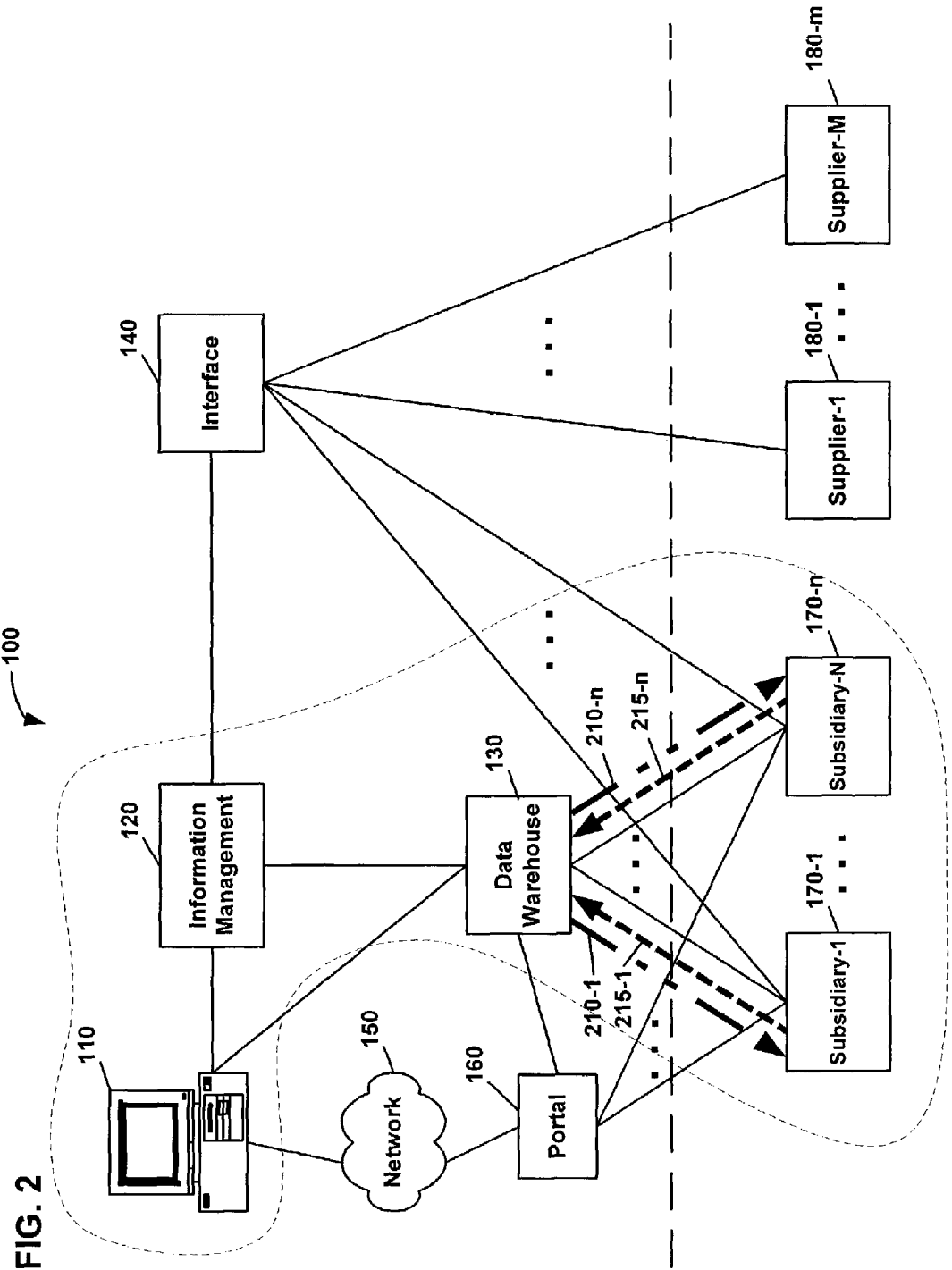
FIG. 2 is a block diagram of the enterprise-wide integrated ERP management system of FIG. 1 illustrating information flow paths used in the generation of an integrated output of information across the enterprise-wide integrated ERP management system, in accordance with an embodiment of the present invention.

FIG. 2 is a block diagram of the enterprise-wide integrated information management system of FIG. 1 illustrating information flow paths used in the generation of an integrated output of information distributed across the enterprise-wide integrated information management system, in accordance with an embodiment of the present invention. In general, updating the information at data warehouse application 130 may be performed by sending a request for the desired data to one or more of subsidiary-1 . . . subsidiary-N 170-1 . . . 170-n from data warehouse application 130. The one or more of subsidiary-1 . . . subsidiary-N 170-1 . . . 170-n may each respond by sending the requested data back to data warehouse application 130 where it may be transformed to fit within the data structure resident in data warehouse application 130, if necessary. In FIG. 2, the paths used to enable consolidated reporting within one company, for example, the headquarter company, are illustrated according to the embodiment.

An example of when a data transformation may occur, in FIG. 2, is during an inventory reconciliation/consolidation between subsidiary-1 170-1 and data warehouse application 130. Specifically, the data base at subsidiary-1 170-1 may have stock items identified by a 20 character field named "Item No.", while the data base at data warehouse application 130 may have stock items identified by an 18-character field named "Material No.". For example, in such a situation the 20-character Item No. may contain the 18 characters contained in the Material No. field in the first 18 characters and a 2-character code in the last 2 characters to identify the specific supplier of that particular item may be contained in the last two characters in the field. Therefore, during a data reconciliation of the data at subsidiary-1 170-1 with the data in data warehouse application 130, each 20-character Item No. from subsidiary-1 170-1 may be mapped to the correct 18 character Material No. at data warehouse application 130. In addition, if tracked at data warehouse application 130, the 2 character supplier code may be stored in an appropriate location in data warehouse application 130, for example, a supplier code field that may be associated with each Material No. in data warehouse application 130.

Alternatively, the fields may have the same character length but only have different names, which may only require that the fields be mapped to each other during the data reconciliation/consolidation. Likewise, the fields may have the same names but different character lengths, which, in addition to the mapping process, may need the data to be converted/truncated to fit into the available space during the data reconciliation/consolidation.

In accordance with another embodiment of the present invention, data requests may be sent from at least one of subsidiary-1 . . . subsidiary-N 170-1 . . . 170-n, for example, subsidiary-1 170-1, to data warehouse application 130. In this embodiment, subsidiary-1 170-1 may send (215-1) to data warehouse application 130 an order for a number of a specific supply item. Data warehouse application 130 may identify a source, for example, subsidiary-N 170-n, for the number of the specific supply item and send (210-n) an order to subsidiary-N 170-n to ship the desired number of the specific supply item to subsidiary-1 170-1. Subsidiary-N 170-n may send (215-n) a verification of the order back to data warehouse application 130 which may send (210-1) the notification to subsidiary-1 170-1. Subsidiary-N 170-n may subsequently send (215-n) a notification to data warehouse application 130 that the order has been shipped out, and data warehouse application 130 may send (210-1) the shipping notification to subsidiary-1 170-1. Although, the above embodiment is directed to a simplified, successful scenario for reasons of clarity, numerous other scenarios may exist. For example, the data warehouse application 130 may determine that the requested number of the specific supply item is not available at any of the other subsidiaries, either individually or in combination, and may send a message back to subsidiary-1 170-1 to that effect, whereupon subsidiary-1 170-1 may send back to data warehouse application 130 a cancellation or an order for whatever quantity of the specific supply item is available.

Figure 3:
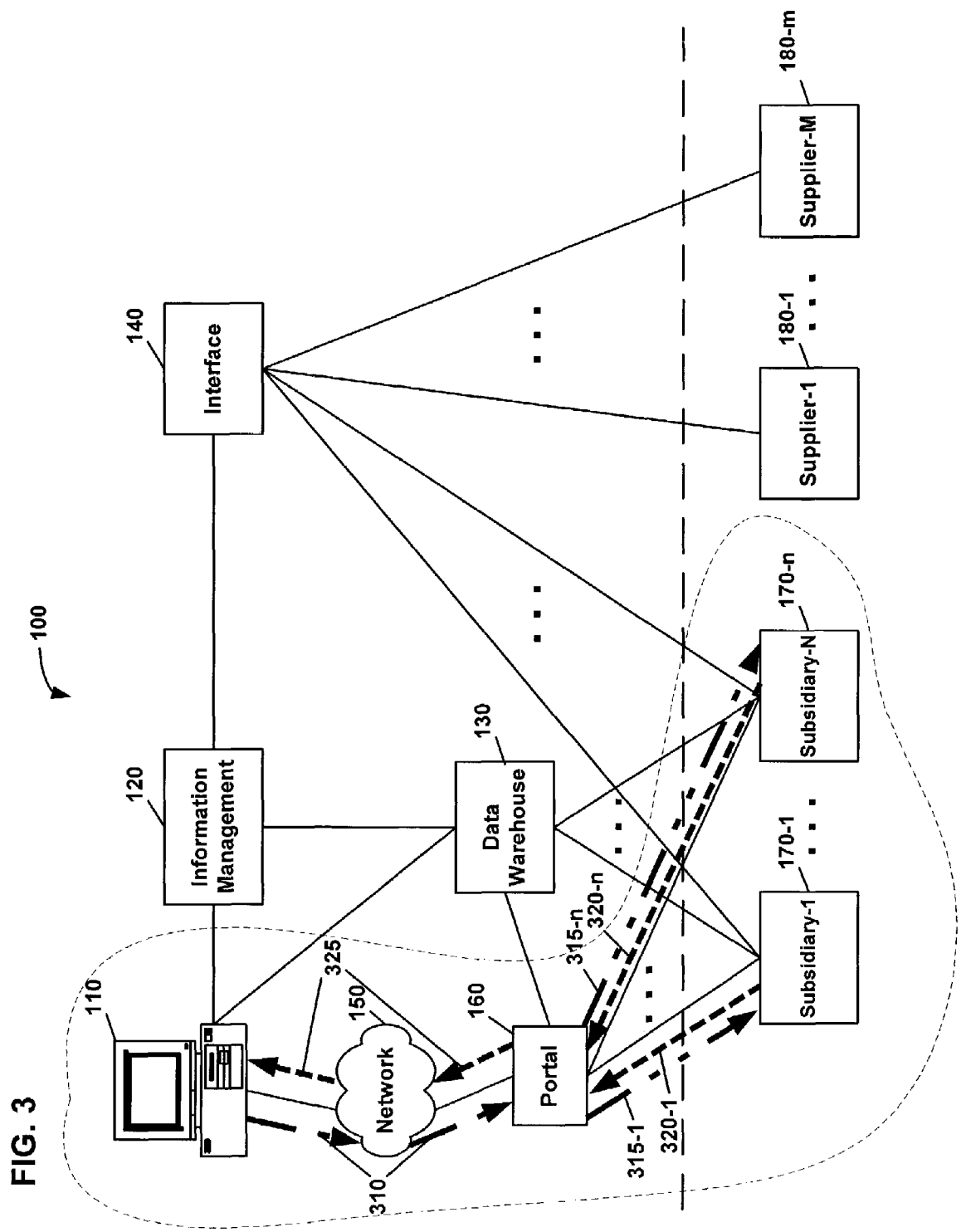
FIG. 3 is a block diagram of the enterprise-wide integrated ERP management system of FIG. 1 illustrating information flow paths used in the generation of an integrated output of information to and from subsidiaries distributed in the enterprise-wide integrated ERP management system, in accordance with an embodiment of the present invention.

FIG. 3 is a block diagram of the enterprise-wide integrated information management system of FIG. 1 illustrating information flow paths used in the generation of an integrated output of information from subsidiaries distributed in the enterprise-wide integrated ERP management system, in accordance with an embodiment of the present invention. In FIG. 3, the paths used to enable consolidated reporting across subsidiaries are illustrated.

In FIG. 3, a user at workstation 110, for example, a supply chain manager in a company's headquarters office, may need to view, in real-time, the current stock on-hand inventory information at his subsidiaries to determine if and where he has the inventory to supply a manufacturing location. In accordance with embodiments of the present invention, and as described above in relation to FIG. 1, the supply chain manager may logon (310, 325) to a web page application at portal 160 to request information from several sources, for example, data warehouse application 130 and one or more of subsidiary-1 . . . subsidiary-N 170-1 . . . 170-n.

In FIG. 3, in accordance with an embodiment of the present invention, if the supply chain manager wants to see all of the available inventory at each subsidiary, he or she may send (315-1 . . . 315-N) the request to one or more of subsidiary-1 . . . subsidiary-N 170-1 . . . 170-n from portal 160 to determine the current stock levels. To do this the supply chain manager may access portal 160 using an Internet browser program, for example, Internet Explorer from Microsoft Corporation and/or Netscape from Netscape Communications, to connect to a web page/application running on the portal. Once connected to portal 160, the supply chain manager may request information from one or more of subsidiary-1 . . . subsidiary-N 170-1 . . . 170-n. For example, the supply chain manager may request the information from subsidiary-1 170-1 using one or more predetermined query formats. Each query format may be implemented as a program to retrieve and display pertinent data from internal and/or external company resources on portal 160. Similarly, multiple web pages may be used to contain multiple query formats. For example, internal resources may include one or more of subsidiary-1 . . . subsidiary-N 170-1 . . . 170-n and external resources may include one or more of supplier-1 . . . supplier-M 180-1 . . . 180-M within the web page at portal 160. In general, each of the one or more predetermined query formats may be pre-configured with which of subsidiary-1 . . . subsidiary-N 170-1 . . . 170-n are to receive the request and send (315-1 . . . 315-n) the request to the determined subsidiaries. Each of the receiving subsidiaries may respond to the request by sending (320-1 . . . 320-n) a reply back to portal 160. The predetermined query format selected at portal 160 may either display (325) each subsidiaries response separately or it may consolidate the replies and display (325) the consolidated response in a predetermined response format inside the web page of portal 160. Once displayed, the user at workstation 110 may view the predetermined response format. According to the embodiment of the present invention, between workstation 110 and portal 160 there may only be web or Internet access of the web page at portal 160 using the URL of the web page. The predetermined response formats may each be implemented as a "sub window" of the web page of portal 160. In general, the predetermined query and response formats are considered permanent and are not subject to change by the user. However, embodiments of the present invention are contemplated in which "editable", that is changeable by the user, versions of the predetermined query and response formats may be available.

A benefit of being able to make this request is that the supply chain manager may receive the most current consolidated inventory information from his or her subsidiaries, which may be more detailed and provide more up-to-date information than what is contained at either information management application 120 and/or data warehouse application 130. This, of course, may depend directly on the amount of time that has elapsed since the last time the data at information management application 120 and/or data warehouse application 130 was reconciled with data from subsidiary-1 . . . subsidiary-N 170-1 . . . 170-n.

In accordance with other embodiments of the present invention, data and/or information requests may be sent to the supply chain manager at workstation 110 from at least one of subsidiary-1 . . . subsidiary-N 170-1 . . . 170-n. For example, subsidiary-1 170-1 may send (320-1) to portal 160 a query for information on a specific supply item. Portal 160 may display (325) the query for the supply chain manager at workstation 110. The supply chain manager at workstation 110 may obtain the information and enter (310) the information into the web page format at portal 160. Portal 160 may send (315-1) the information back to subsidiary-1 170-1. Although, the above embodiment is directed to a simplified, successful scenario for reasons of clarity, numerous other scenarios may exist. For example, scenarios similar to those discussed above for FIG. 2, as well as others described herein, may also be possible.

Figure 4:
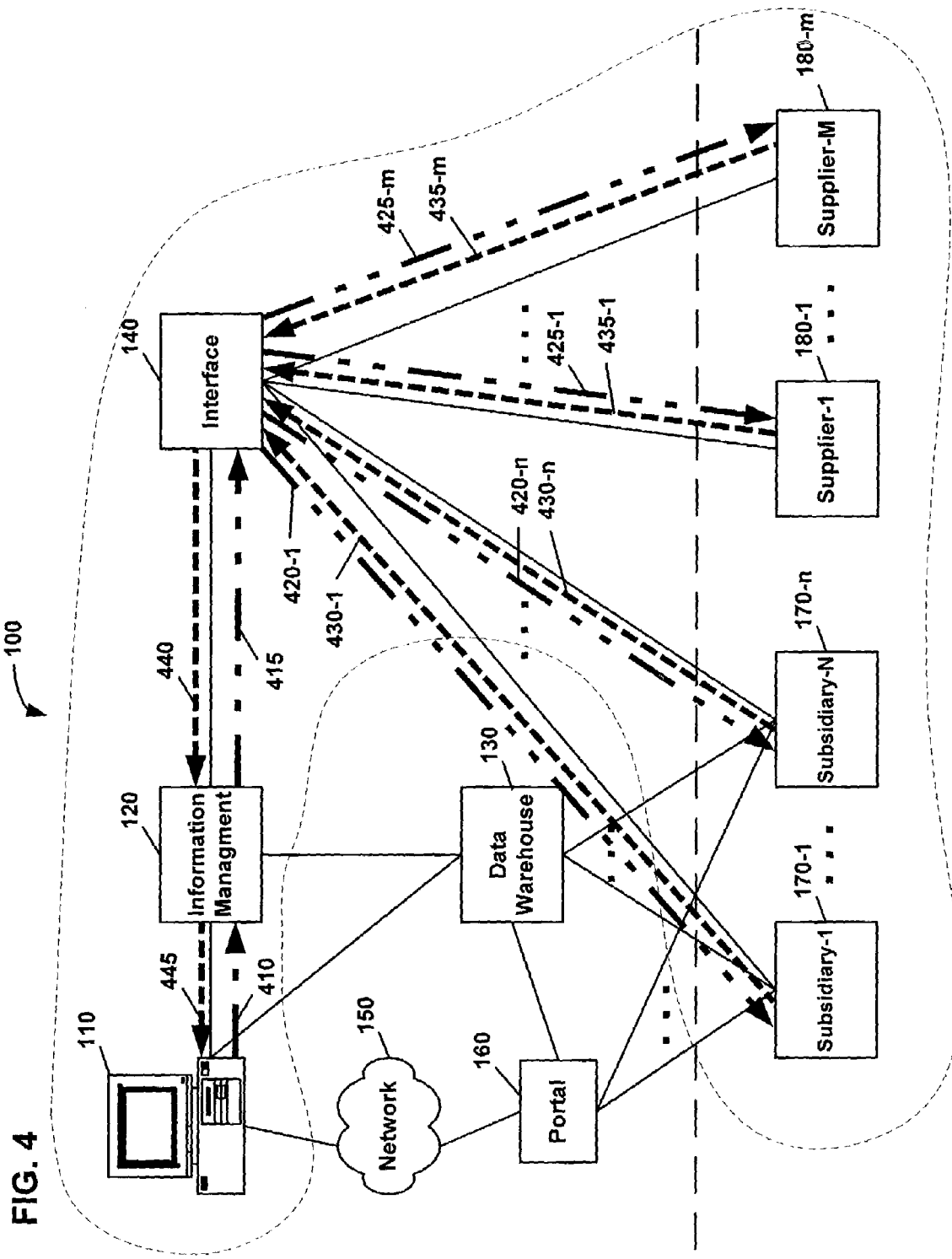
FIG. 4 is a block diagram of the enterprise-wide integrated ERP management system of FIG. 1 illustrating information flow paths used in the generation of an integrated output of information to and from subsidiaries and/or suppliers distributed in the enterprise-wide integrated ERP management system, in accordance with an embodiment of the present invention.

FIG. 4 is a block diagram of the enterprise-wide integrated ERP management system of FIG. 1 illustrating information flow paths used in the generation of an integrated output of information from subsidiaries and/or suppliers distributed in the enterprise-wide integrated ERP management system, in accordance with an embodiment of the present invention. In other words, FIG. 4 illustrates how collaboration across different company borders, for example, the company's' and the suppliers' separate borders between heterogeneous applications may be implemented using interface application 140. Interface application 140 may accomplish this collaboration by integrating different versions of a given application as well as different applications. The integration may be achieved using an open architecture-based interface application 140 with message-oriented communications, for example, hypertext transfer protocol (HTTP) communications using extensible markup language (XML) messages.

In FIG. 4, in accordance with an embodiment of the present invention, data requests may flow from the subsidiaries up to the corporate headquarters supply chain manager. For example, in an order fulfillment scenario, a salesperson at subsidiary-1 170-1 may create an order (not shown) for a product to be sent to a customer and may send (430-1, 440) the order to information management application 120 via interface application 140. The supply chain manager at workstation 110 may view the order on information management application 120, may ship out (not shown) the ordered product, and may send (415, 420-1) a message indicating that that the product was shipped to the salesperson at subsidiary-1 170-1 from information management application 120 via interface application 140. The salesperson at subsidiary 170-1 may receive the message, generate an invoice to bill the customer and may send the bill out to the customer for payment.

Figure 5:
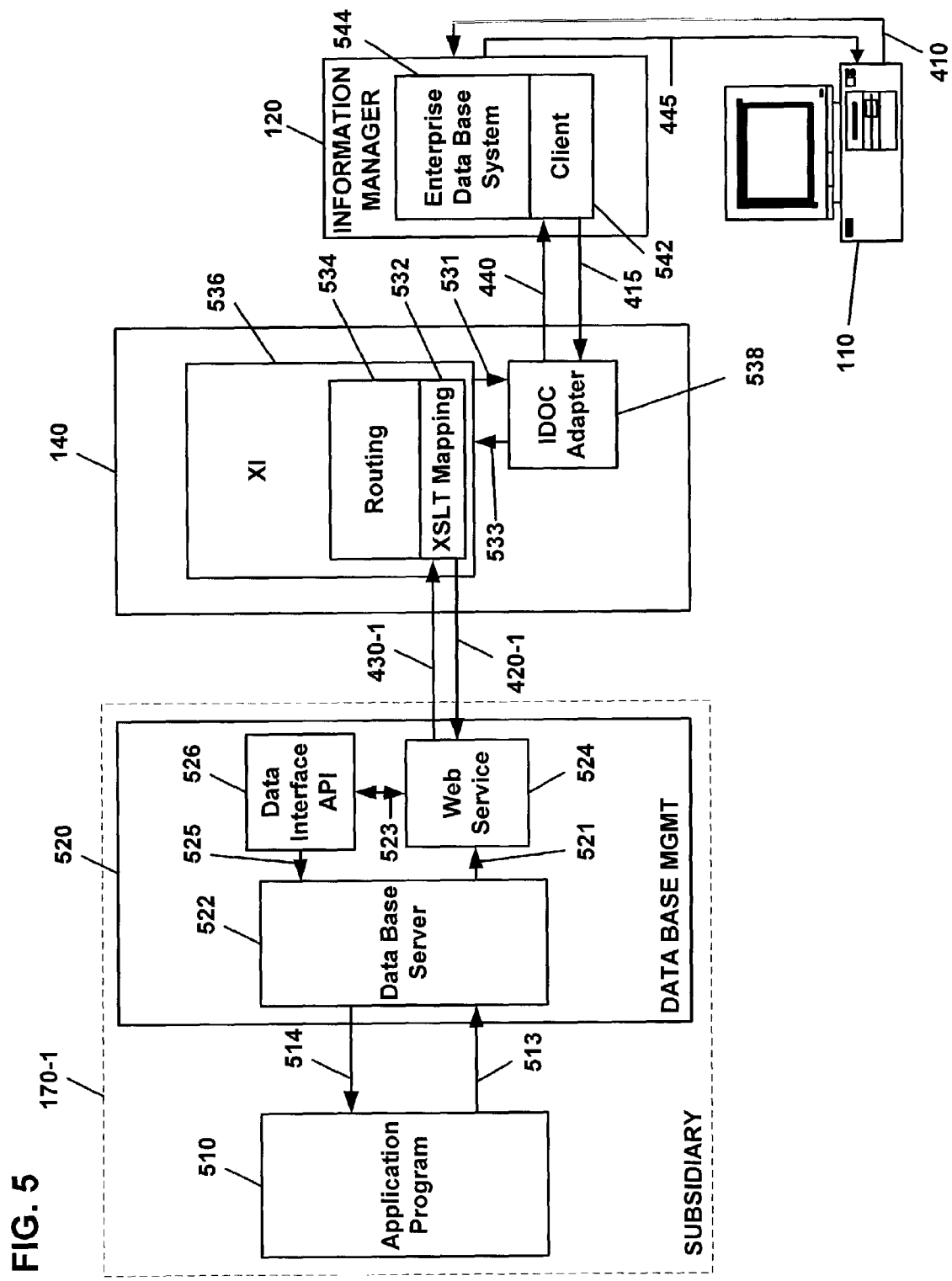
FIG. 5 is a detailed block diagram showing implementation details in the elements and data flows involved in the data flow illustrated in FIG. 4, in accordance with an embodiment of the present invention.

FIG. 5 is a detailed block diagram showing implementation details in the elements and data flows involved in the data flow illustrated in FIG. 4, in accordance with an embodiment of the present invention. For example, according to the embodiment, in the order fulfillment scenario described above for FIG. 4, in FIG. 5, a salesperson at subsidiary-1 170-1 may connect to a data base management system 520 at subsidiary-1 170-1 to create an order for a product to be sent to a customer. For example, an application 510 may connect to data base management system 520 via a data base server 522 to send the order to information management application 120 via data base management system 520 and interface application 140 where the supply chain manager at workstation 110 may view (410, 445) the order on information management application 120.

In FIG. 5, in accordance with an embodiment of the present invention, application 510 may connect to data base server 522 by establishing a link with one or more objects in data base server 522. More specifically, application 510 may be used to send (521, 430-1) the order from data base server 522 through a web service component 524 in data base management system 520 using (523) a data interface (DI) application programming interface (API) 526 to interface application 140. More specifically, the order may be sent (521, 430-1) to an Extensible Stylesheet Language Transformations (XSLT) mapping component 532, which may be a part of a routing client 534 in an exchange infrastructure (XI) 536 in interface application 140. According to the embodiment, web service component 524 may enable communication between data base management system 520 and interface component 140 using, for example, simple object access protocol (SOAP) and extensible markup language (XML) messages. XSLT mapping component 532 may perform data mapping functions to ensure the format of the order is compatible with the format of the data in information management application 120, if necessary, and may send (531) the order, either the original or reformatted order, to an intermediate documents (IDOC) adapter 538 within interface application 140. IDOC adapter 538 may be used to connect components (or external systems) to interface application 140 using an IDOC communication format and may send (440) the order to a client application 542 running on an enterprise data base system 544 in information management application 120 where the supply chain manager may access the order from workstation 110 by viewing (410, 445) the order on information management application 120 through enterprise data base system 544. The supply chain manager may ship out (not shown) the ordered product, if available stock levels permit.

The supply chain manager may also send (415, 420-1) a message back to the salesperson at subsidiary-1 170-1 on whether the product shipped, from information management application 120 via interface application 140. Specifically, the supply chain manager may send (415) the message from enterprise data base system 544 through client application 542 to IDOC adapter 538 in interface application 140. IDOC adapter 538 may send (533) the message to XI system 536, where XSLT mapping component 532 may send (420-1) the message to web service 524 in data base management system 520. Web service 524 may send (523) the message to data base server 522 via data interface API 526, where the message in data base server 522 may be viewed (513, 514) using application 510. The salesperson at subsidiary-1 170-1 may view the message, generate an invoice to bill the customer and send the invoice out for payment and/or to notify the customer that the order was placed, back-ordered and/or shipped.

Figure 6:
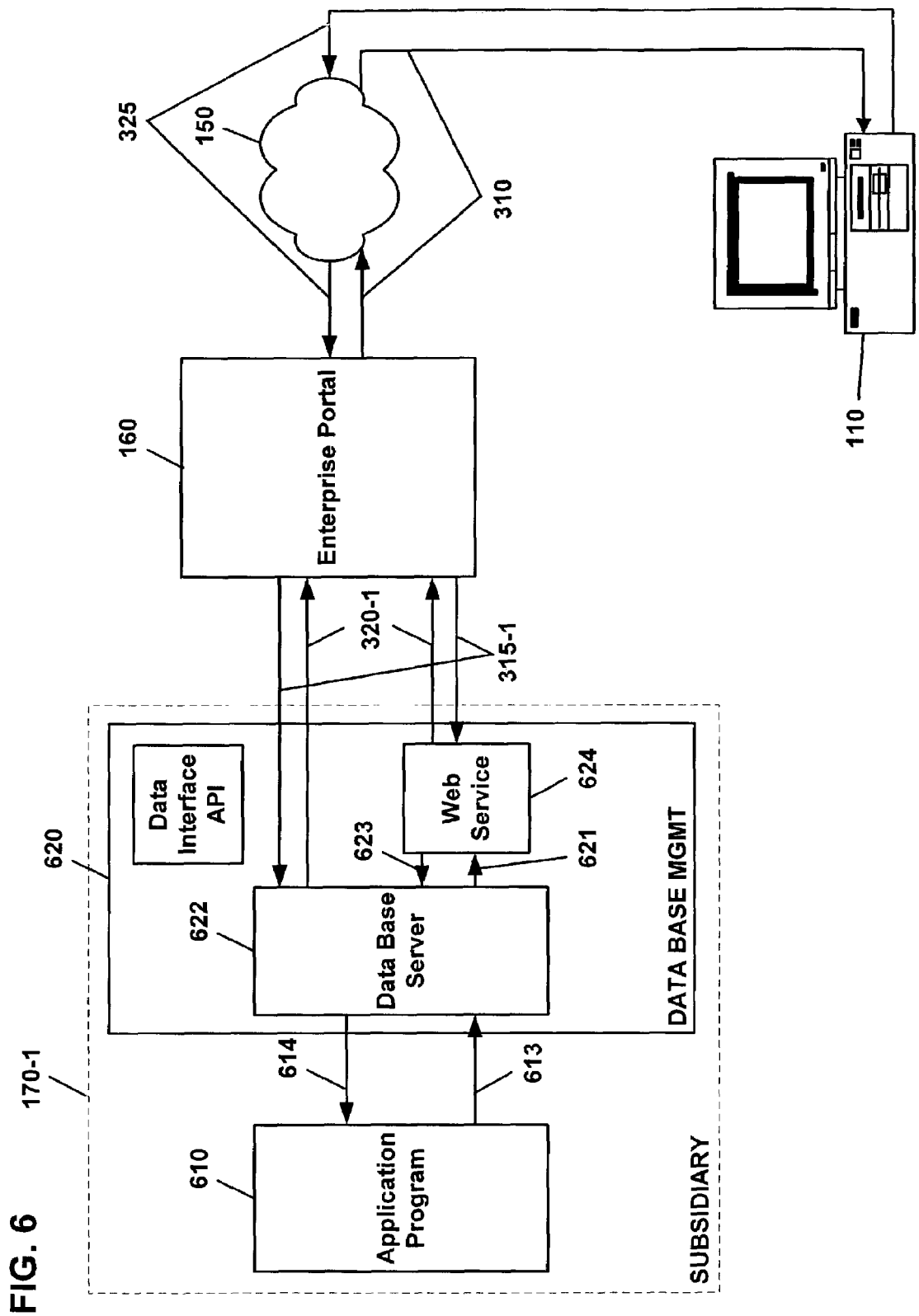
FIG. 6 is a detailed block diagram showing implementation details in the elements and data flows involved in the data flow illustrated in FIG. 3, in accordance with an embodiment of the present invention.

FIG. 6 is a detailed block diagram showing implementation details in the elements and data flows involved in the data flow illustrated in FIG. 3, in accordance with an embodiment of the present invention. For example, in accordance with an embodiment of the present invention, in the information request scenario described above for FIG. 3, data and/or information requests may be sent from at least one of subsidiary-1 . . . subsidiary-N 170-1 . . . 170-n, for example, subsidiary-1 170-1, to the supply chain manager at workstation 110. For example, as described above for FIG. 1, in FIG. 6, a user may logon (613, 621, 320-1) to a web page at portal 160 using an application 610, such as an Internet browser program, at subsidiary-1 170-1 and may connect to enterprise portal 160 via a data base server 622 and a web service 624, which may be connected to data base server 622, in a data base management system 620. Application 610 may be used to enter a query for information on a specific supply item in the web page at portal 160 in, for example, a predetermined format available in the web page at portal 160. The query for information may be displayed at portal 160 for a user, for example, a supply chain manager, at workstation 110 to access. Similar to the user of application 610, the supply chain manager at workstation 110 may logon (325, 310) to the web page at portal 160, view (310, 325) the query from the user of application 610, and enter a response to the query in the web page.

In FIG. 6, the supply chain manager may use workstation 110 to obtain the information requested in the query from an external source, for example, information management application 110, and enter the information in the web page at portal 160. For example, although the FIG. 1 connection to information management application 120 is not shown here for reasons of clarity, in FIG. 6, if the information is not local to workstation 110, the supply chain manager may request the information from information management application 120. Portal 160 may display the information on the web page for application 610 to access (613, 621, 624, 320-1, 315-1, 614) via data base server 622 and/or web service 624. The information may be displayed in the web page in a predetermined output format associated with the predetermined query. Although, the above embodiment is directed to a simplified, successful information request scenario, for reasons of clarity, numerous other scenarios may exist. For example, scenarios similar to those discussed above for FIG. 2, as well as others described herein, may also be possible.

Figure 7:
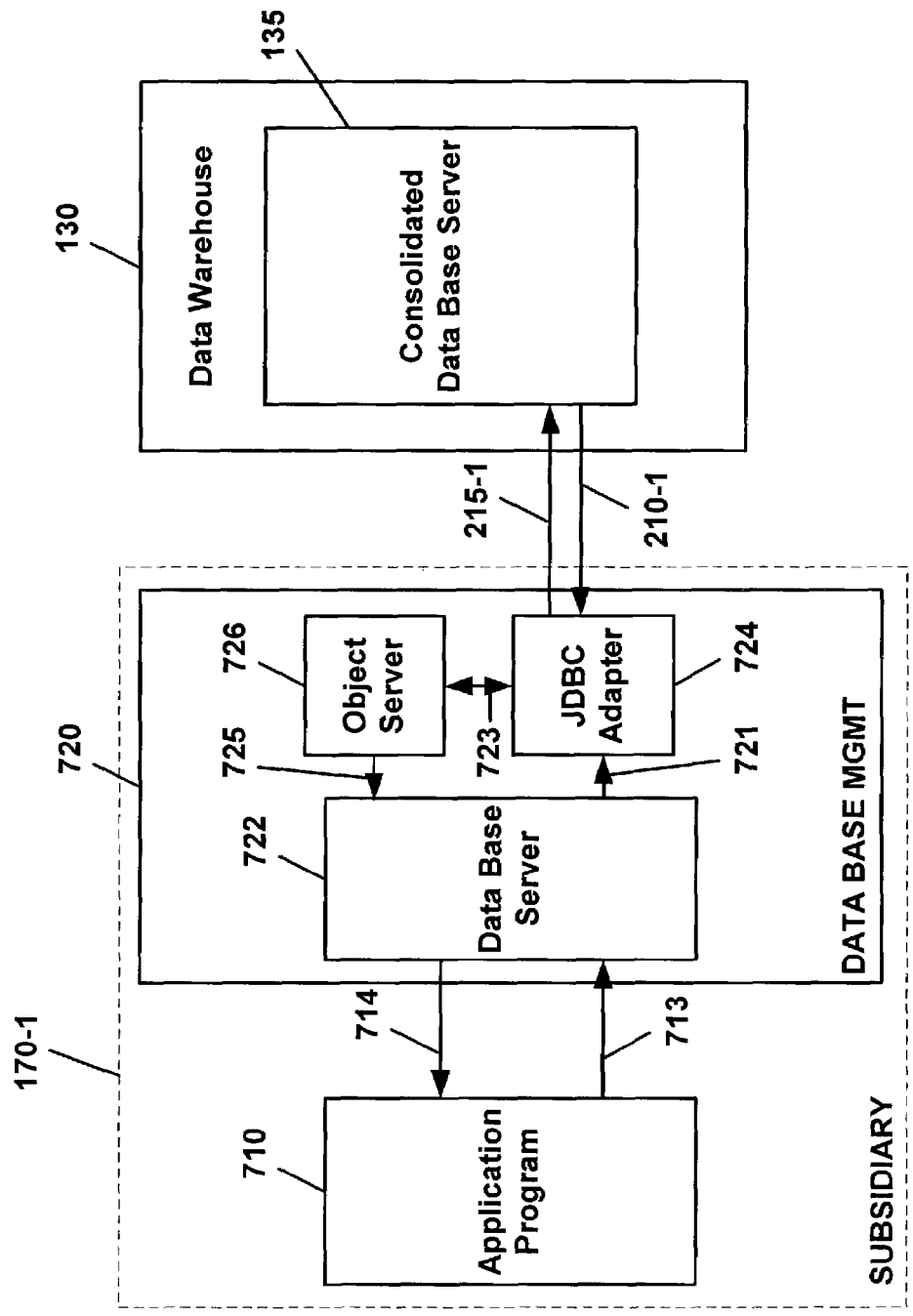
FIG. 7 is a detailed block diagram showing implementation details in the elements and data flows involved in the data flow illustrated in FIG. 2, in accordance with an embodiment of the present invention.

FIG. 7 is a detailed block diagram showing implementation details in the elements and data flows involved in the data flow illustrated in FIG. 2, in accordance with an embodiment of the present invention. For example, in accordance with an embodiment of the present invention, in the data request scenario described above for FIG. 2, in FIG. 7, data requests may be sent from at least one of subsidiary-1 . . . subsidiary-N 170-1 . . . 170-n, for example, subsidiary-1 170-1, to data warehouse application 130. For example, a user of an application 710 may send (713) a request for data to a data base server 722 in a data base management system 720. Data base server 722 may send (721) the data request to a Java Database Connectivity (JDBC) adapter 724, which may format and send (215-1) the data request to a consolidated data base server 135 in data warehouse application 130. JDBC adapter 724 may use (723) an object server 726 in data base management system 720 to ensure that the format of the request is compatible with data warehouse application 130. Consolidated data base server 135 may identify the requested data and send (210-1) a response to JDBC adapter 724 in data base management system 720. JDBC adapter may send (723) the response to object server 726 for any re-formatting necessary to be compatible with data base server 722, and object server 726 may send (725) the response to data base server 722. Data base server 722 may send (714) the response to application 710. Although, the above embodiment is directed to a simplified, successful scenario for reasons of clarity, numerous other scenarios may exist. For example, the data warehouse application 130 may determine that the requested number of the specific supply item is not available at any of the other subsidiaries, either individually or in combination, and may send a message back to subsidiary-1 170-1 to that effect, whereupon subsidiary-1 170-1 may send back to data warehouse application 130 a cancellation or an order for whatever quantity of the specific supply item is currently available. In addition, the interface between application 710 and data base management system 720 may be implemented using a browser and web page configuration as described above, for example, in relation to FIG. 1.

Figure 8:
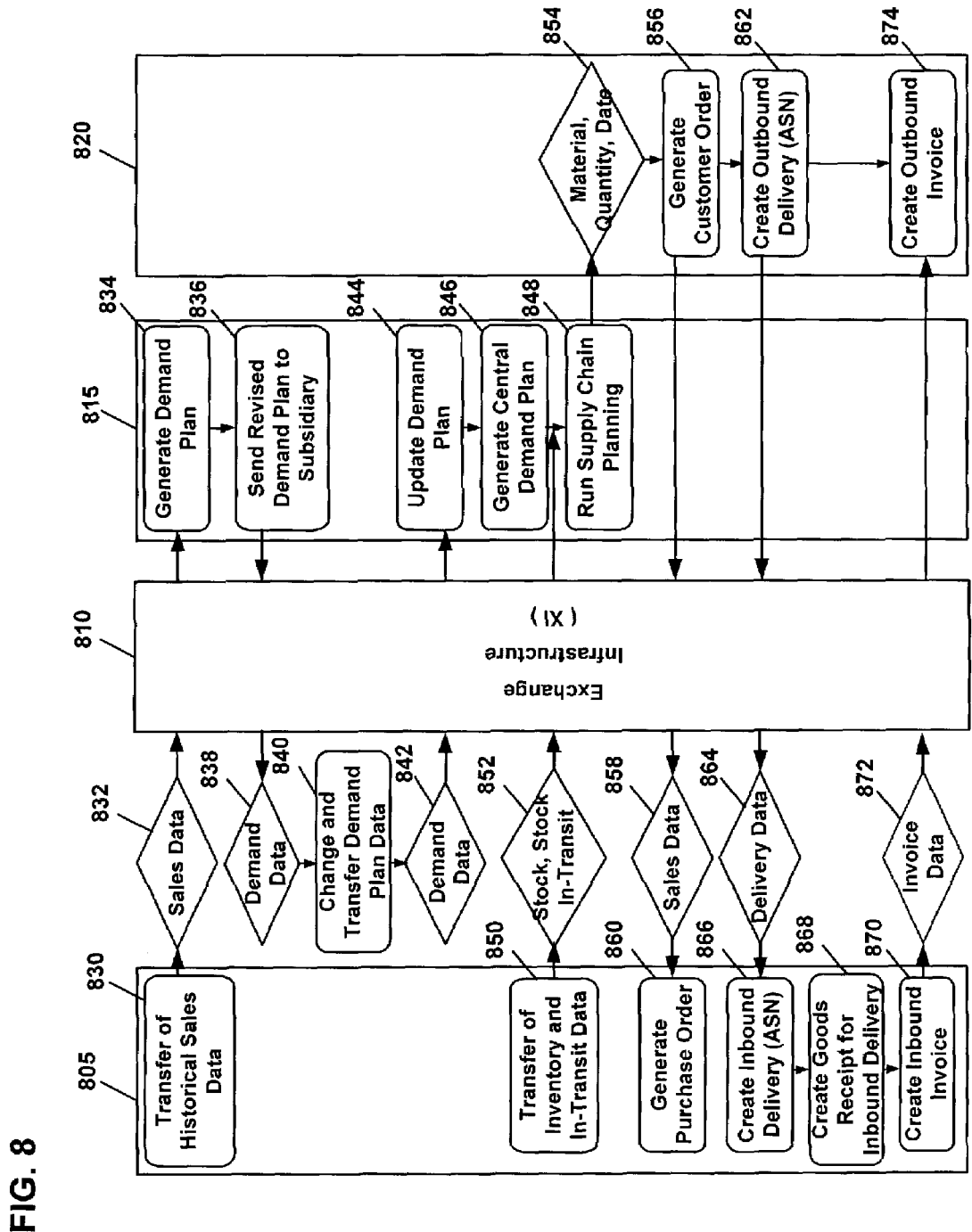
FIG. 8 is a detailed flow diagram of an integrated scenario method for performing central supply planning in the enterprise-wide integrated ERP management system, for example, between a head office and its subsidiaries, in accordance with an embodiment of the present invention.

FIG. 8 is a detailed flow diagram of an integration scenario method for performing central supply planning in the enterprise-wide integrated information management system, for example, between a head office and its subsidiaries, in accordance with an embodiment of the present invention. It should be clear that FIG. 8 is merely illustrative of one of the many integration scenarios possible with the systems and methods described herein. As such, the system and methods of the present invention may provide the technical infrastructure and/or basis necessary to build-up any collaborative and/or integrative scenario with distributed business transactions between a head office and its subsidiaries or between suppliers and manufacturers.

In FIG. 8, in accordance with an embodiment of the present invention, a subsidiary and/or supplier sales system 805 may be connected to an exchange interface 810, which may be connected to a central planning system 815 and a central supply system 820 located at, for example, a company's headquarters office. Subsidiary sales system 805 may transfer (830) historical sales data 832 to central planning system 815 via exchange interface 810 where it may be used to generate (834) a revised demand plan estimate of future sales figures. Demand data 838 from the revised demand plan estimate may be accessed by a user at subsidiary sales system 805, who has logged-on to central planning system 815 via a web service and may be used to change (840) the revised demand plan kept at central planning system 815. Revised demand data 842 from the demand plan may be sent (840) back to central planning system 815 via exchange interface 810 where the revised demand plan may be updated (844). The revised demand plan may be used to generate (846) a central demand plan at the corporate head office. It should be noted that the central demand plan in central planning system 815 may include data from more than just the single subsidiary described above. For example, the entire process may be repeated for each subsidiary and/or supplier connected to the corporate head office before generating (846) the central demand plan.

In FIG. 8, in accordance with an embodiment of the present invention, subsidiary sales system 805 may also transfer (850) inventory and in-transit data, specifically, stock and stock in-transit data 852, to central planning system 815 via exchange interface 810 where the data can be combined with the central demand plan to perform (848) supply chain planning. As an output of the supply chain planning, a materials list 854 may be sent to central supply system 820 for use in generating (856) individual customer orders, from which sales data 858 may be sent back to subsidiary sales system 805 via exchange interface 810. Materials list 854 may include, but is not limited to, for example, a material item number, a quantity and a need-by/demand date. Sales data 858 may be used by subsidiary sales system 805 to generate (860) a purchase order for items specified in sales data 858. The individual customer orders may also be used to create an outbound delivery advance(d) shipping notice (ASN) confirmation for each order, from which delivery data 864 may be sent to subsidiary sales system 805 via exchange interface 810. Delivery data 864 may be used to create (866) an inbound delivery ASN. The inbound delivery ASN may also be used to create (868) a goods receipt for the inbound delivery, which, in turn, may be used to create (870) an inbound invoice containing invoice data 872 at subsidiary sales system 805. The inbound invoice and invoice data 872 may be sent to central supply system 820 via exchange interface 810, and central supply system 820 may use invoice data 872 and information from created (862) outbound delivery ASN to create (874) an outbound invoice.

Several embodiments of the present invention are specifically illustrated and described herein. However, it should be appreciated that modifications and variations of the present invention are covered by the above teachings and come within the purview of the appended claims without departing from the spirit and intended scope of the invention.

What is claimed is:

1. A method for integrating and distributing information between computer systems of first and second entities, the computer systems storing transactional data in respective data formats, the computer systems having different data structures, comprising:

selecting a connection path from among a first communication path, a second communication path, and a third communication path, each of the first, second and third communication paths extending between the first entity and the second entity, wherein the first communication path connects the first entity via a data base server, a data interface application programming interface and a web service through a data mapping component and an intermediate documents adapter in a data exchange interface using simple object address protocol messages and extensible markup language messages to the second entity, wherein the second communication path connects the first entity via a data warehouse to the second entity, wherein the third communication path connects the first entity via a web portal to the second entity;

generating a communication having a first data structure at the first entity, the communication directed to the second entity, wherein the second entity uses a second data structure;

transforming, based on the selected communication path, the communication into a data structure compatible with the data structure of the second entity;

sending the transformed communication to the second entity;

generating a response to the communication to the first entity from the second entity, wherein the response has a format compatible with the second data structure; and converting, based on the selected communication path, the generated response from the format compatible with the second data structure to a format compatible with the first data structure for presentation at the first entity.

2. The method of claim 1, wherein when the first communication path is selected, the sending comprises:

sending the communication to an enterprise data management system at the second entity and through the data exchange interface from an application program connected to the first entity.

3. The method of claim 2, wherein the transforming occurs at the application programming interface.

4. The method of claim 3, wherein the transforming further comprises:

formatting the transformed communication into a communication format by the intermediate documents adapter.

5. The method of claim 1, the transforming further comprises:

performing by the data mapping component in the data exchange interface data mapping of the data structure of the communication to a data structure compatible with the second entity; and converting, by the intermediate documents adapter, the data mapped communication to a communication format compatible for communication with the second entity.

6. The method of claim 1, wherein the transforming occurs at the data warehouse coupled to the first entity and the second entity, which comprises the chosen first communication path.

7. The method of claim 1, wherein the transforming occurs at the web portal coupled to the first entity and the second entity, which comprises the chosen first communication path.

8. A workstation-readable medium embodied with computer program instructions of a method for integrating and distributing information between computer systems of first and second entities, the computer systems storing transactional data in respective data formats, the computer systems having different data structures, the computer program instructions causing a workstation to execute the following:

selecting a connection path from among a first communication path, a second communication path, and a third communication path, each of the first, second and third communication paths extending between the first entity and the second entity, wherein the first communication path connects the first entity via a data base server, a data interface application programming interface and a web service through a data mapping component and an intermediate documents adapter in a data exchange interface using simple object address protocol messages and extensible markup language messages to the second entity, wherein the second communication path connects the first entity via a data warehouse to the second entity, wherein the third communication path connects the first entity via a web portal to the second entity;

generating a communication having a first data structure at the first entity, the communication directed to the second entity, wherein the second entity uses a second data structure;

transforming, based on the selected communication path, the communication into a data structure compatible with the data structure of the second entity;

sending the transformed communication to the second entity;

generating a response to the communication to the first entity from the second entity, wherein the response has a format compatible with the second data structure; and converting, based on the selected communication path, the generated response from the format compatible with the second data structure to a format compatible with the first data structure for presentation at the first entity.

9. The workstation-readable medium of claim 8, wherein when the first communication path is selected, the sending comprises:

sending the communication to an enterprise data management system at the second entity and through the data exchange interface from an application program connected to the first entity.

10. The workstation-readable medium of claim 9, wherein the transforming occurs at the application programming interface.

11. The workstation-readable medium of claim 10, wherein the transforming further comprises:

formatting the transformed communication into a communication format by the intermediate documents adapter.

12. The workstation-readable medium of claim 8, the transforming further comprises:

performing by the data mapping component in the data exchange interface data mapping of the data structure of the communication to a data structure compatible with the second entity; and converting, by the intermediate documents adapter, the data mapped communication to a communication format compatible for communication with the second entity.

13. The workstation-readable medium of claim 8, wherein the transforming occurs at the data warehouse coupled to the first entity and the second entity, which comprises the chosen first communication path.

14. The workstation-readable medium of claim 8, wherein the transforming occurs at the web portal coupled to the first entity and the second entity, which comprises the chosen first communication path.

* * * * *

UNITED STATES PATENT AND TRADEMARK OFFICE
CERTIFICATE OF CORRECTION

PATENT NO. : 7,590,987 B2  Page 1 of 1
APPLICATION NO. : 10/453527
DATED : September 15, 2009
INVENTOR(S) : Behrendt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1868 days.

Signed and Sealed this

Twenty-first Day of September, 2010

David J. Kappos
*Director of the United States Patent and Trademark Office*